(12) United States Patent
Madej et al.

(10) Patent No.: US 9,038,903 B2
(45) Date of Patent: May 26, 2015

(54) METHOD AND APPARATUS FOR CONTROLLING ILLUMINATION

(71) Applicant: Symbol Technologies, Inc., Schaumburg, IL (US)

(72) Inventors: Dariusz J. Madej, Shoreham, NY (US); David P. Goren, Smithtown, NY (US); Eugene B. Joseph, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/690,229

(22) Filed: Nov. 30, 2012

(65) Prior Publication Data

US 2014/0151452 A1 Jun. 5, 2014

(51) Int. Cl.
*G06K 7/00* (2006.01)
*G06K 7/10* (2006.01)

(52) U.S. Cl.
CPC .................................... *G06K 7/1096* (2013.01)

(58) Field of Classification Search
USPC ........................ 235/440, 462.24, 462.32, 454
See application file for complete search history.

(56) References Cited

U.S. PATENT DOCUMENTS

| | | | |
|---|---|---|---|
| 4,564,287 A | 1/1986 | Suzuki et al. | |
| 4,970,556 A | 11/1990 | Iwata | |
| 5,061,960 A | 10/1991 | Kitajima et al. | |
| 5,107,300 A | 4/1992 | Miyake et al. | |
| 5,608,547 A | 3/1997 | Nakatani et al. | |
| 8,196,839 B2 | 6/2012 | Wang | |
| 8,561,907 B2 * | 10/2013 | Nubling et al. | 235/470 |
| 2010/0140356 A1 * | 6/2010 | Hawley et al. | 235/462.2 |

* cited by examiner

*Primary Examiner* — Ahshik Kim
(74) *Attorney, Agent, or Firm* — Nong-Qiang Fan

(57) ABSTRACT

A method includes transmitting from at least one of the imaging sensors to a controller a short frame data that is collected by the at least one of the imaging sensors when the illumination source is activated to provide the illumination light toward the target object with a first illumination level. The method further includes transmitting subsequently from the at least one of the imaging sensors to the controller a regular frame data that is collected by the at least one of the imaging sensors when the illumination source is activated to provide the illumination light toward the target object with a second illumination level that is determined based upon the short frame data. The size of the regular frame data being at least 50 times larger than the size of the short frame data.

20 Claims, 9 Drawing Sheets

# US 9,038,903 B2

METHOD AND APPARATUS FOR CONTROLLING ILLUMINATION

FIELD OF THE DISCLOSURE

The present invention relates to imaging-based barcode readers having two windows.

BACKGROUND

Various electro-optical systems have been developed for reading optical indicia, such as barcodes. A barcode is a coded pattern of graphical indicia comprised of a series of bars and spaces of varying widths, the bars and spaces having differing light reflecting characteristics. The pattern of the bars and spaces encode information. Barcode may be one dimensional (e.g., UPC barcode) or two dimensional (e.g., DataMatrix barcode). Systems that read, that is, image and decode barcodes employing imaging camera systems are typically referred to as imaging-based barcode readers or barcode scanners.

Imaging-based barcode readers may be portable or stationary. A portable barcode reader is one that is adapted to be held in a user's hand and moved with respect to target indicia, such as a target barcode, to be read, that is, imaged and decoded. Stationary barcode readers are mounted in a fixed position, for example, relative to a point-of-sales counter. Target objects, e.g., a product package that includes a target barcode, are moved or swiped past one of the one or more transparent windows and thereby pass within a field of view of the stationary barcode readers. The barcode reader typically provides an audible and/or visual signal to indicate the target barcode has been successfully imaged and decoded. Sometimes barcodes are presented, as opposed to be swiped. This typically happens when the swiped barcode failed to scan, so the operator tries a second time to scan it. Alternately, presentation is done by inexperience users, such as when the reader is installed in a self check out installation.

A typical example where a stationary imaging-based barcode reader would be utilized includes a point of sale counter/cash register where customers pay for their purchases. The reader is typically enclosed in a housing that is installed in the counter and normally includes a vertically oriented transparent window and/or a horizontally oriented transparent window, either of which may be used for reading the target barcode affixed to the target object, i.e., the product or product packaging for the product having the target barcode imprinted or affixed to it. The sales person (or customer in the case of self-service check out) sequentially presents each target object's barcode either to the vertically oriented window or the horizontally oriented window, whichever is more convenient given the specific size and shape of the target object and the position of the barcode on the target object.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
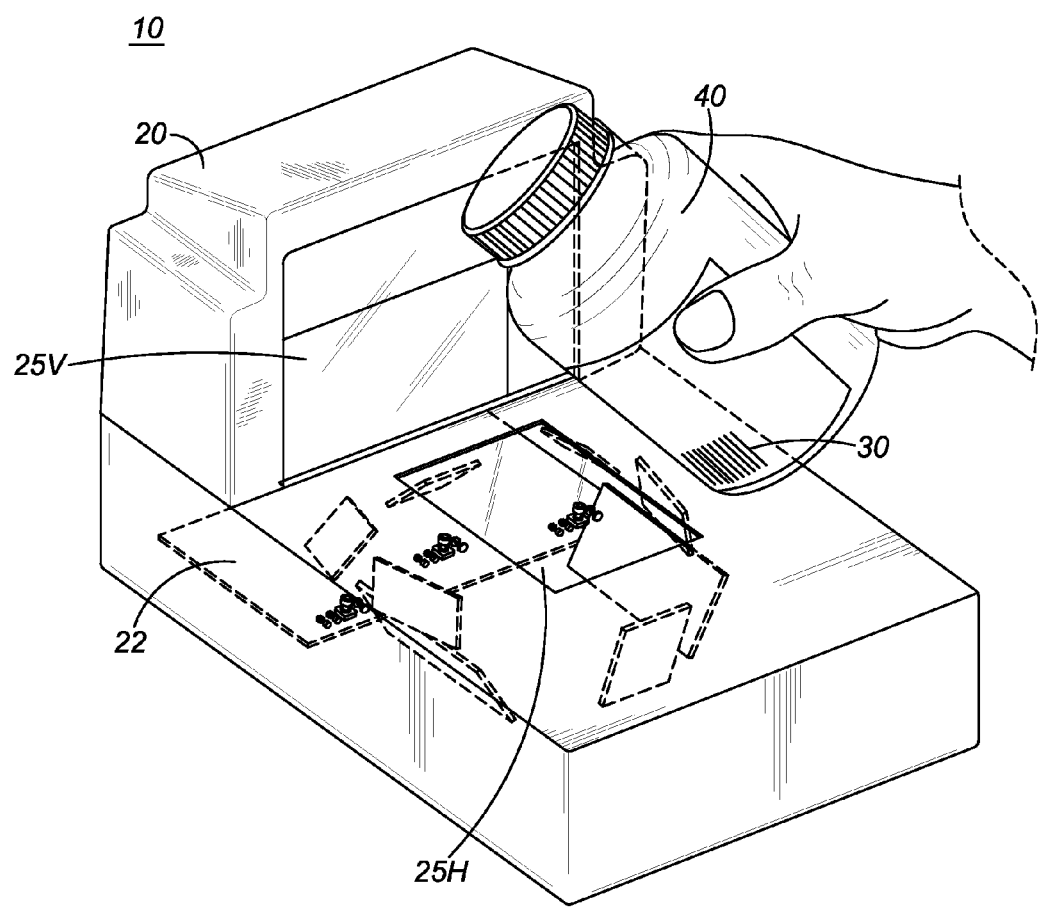
FIG. 1 depicts a workstation in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 depicts a workstation 10 in accordance with some embodiments. The workstation 10 is stationary and includes a housing 20. The housing 20 has a generally horizontal window 25H and a generally vertical window 25V. In one implementation, the housing 20 can be integrated into the sales counter of a point-of-transaction system. The point-of-transaction system can also includes a cash register, a touch screen visual display, a printer for generating sales receipts, or other type user interface. The workstation 10 can be used by retailers to process transactions involving the purchase of products bearing an identifying target, such as UPC symbols.

In accordance with one use, either a sales person or a customer will present a product or target object 40 selected for purchase to the housing 20. More particularly, a target barcode 30 imprinted or affixed to the target object will be presented in a region near the windows 25H and 25V for reading, that is, imaging and decoding of the coded indicia of the target barcode. Upon a successful reading of the target barcode, a visual and/or audible signal will be generated by the workstation 10 to indicate to the user that the target barcode 30 has been successfully imaged and decoded.

Figure 2:
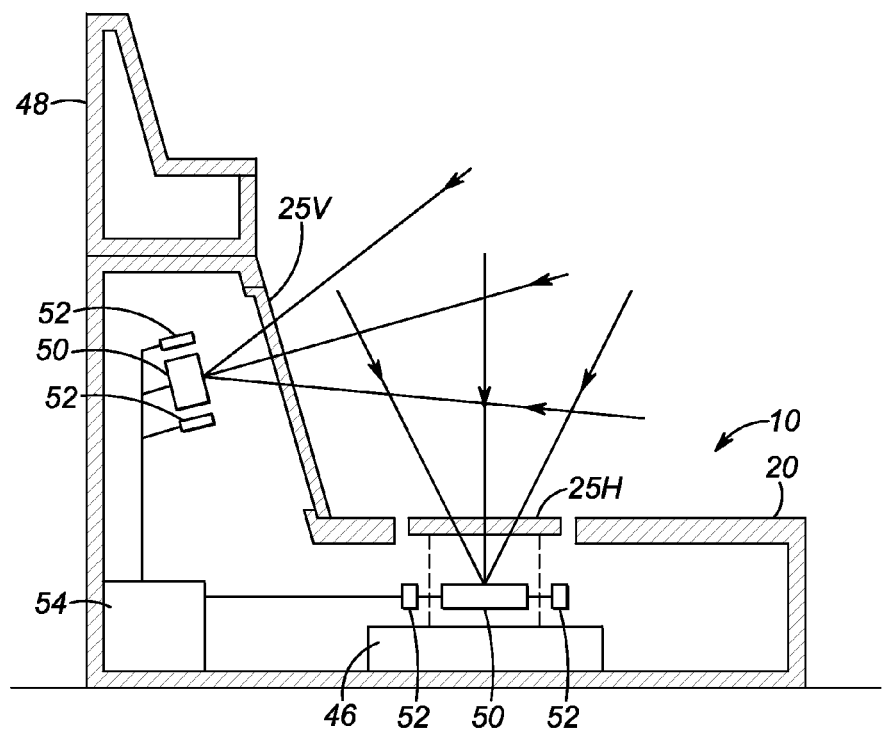
FIG. 2 is a schematic of a bi-optical workstation that includes a plurality of imaging sensors in accordance with some embodiments.

As schematically shown in FIG. 2 in accordance with some embodiments, a plurality of imaging sensors 50, each associated with an illuminator 52, are mounted at the workstation 10, for capturing light passing through either or both windows from a target which can be a one- or two-dimensional symbol, such as a two-dimensional symbol on a driver's license, or any document, as described below. Each imaging sensor 50 is a solid-state area array, preferably a CCD or CMOS array. The imaging sensors 50 and their associated illuminators 52 are operatively connected to a programmed microprocessor or controller 54 operative for controlling the operation of these and other components. Preferably, the microprocessor is the same as the one used for decoding the return light scattered from the target and for processing the captured target images.

In operation, the controller 54 sends successive command signals to the illuminators 52 to pulse the LEDs for a short time period of 300 microseconds or less, and successively energizes the imaging sensors 50 to collect light from a target only during said time period, also known as the exposure time period. By acquiring a target image during this brief time period, the image of the target is not excessively blurred.

As previously stated, FIG. 2 is only a schematic representation of an all imaging sensor-based workstation as embodied in a bi-optical workstation with two windows. The workstation can have other kinds of housings with different shapes. The workstation can have one window, two windows, or with more than two windows. In some embodiments, the workstation can include between one to six imaging sensors. The bi-optical workstation can also include more than six imaging sensors.

FIGS. 3A-3F are schematics of a bi-optical workstation that has six imaging sensors in accordance with some embodiments. In FIGS. 3A-3F, the bi-optical workstation includes six imaging sensors C1, C2, C3, C4, C5, and C6. commonly mounted on a printed circuit board 22. The printed circuit board 22 lies in a generally horizontal plane generally parallel to, and below, the generally horizontal window 25H.

Figure 3A:
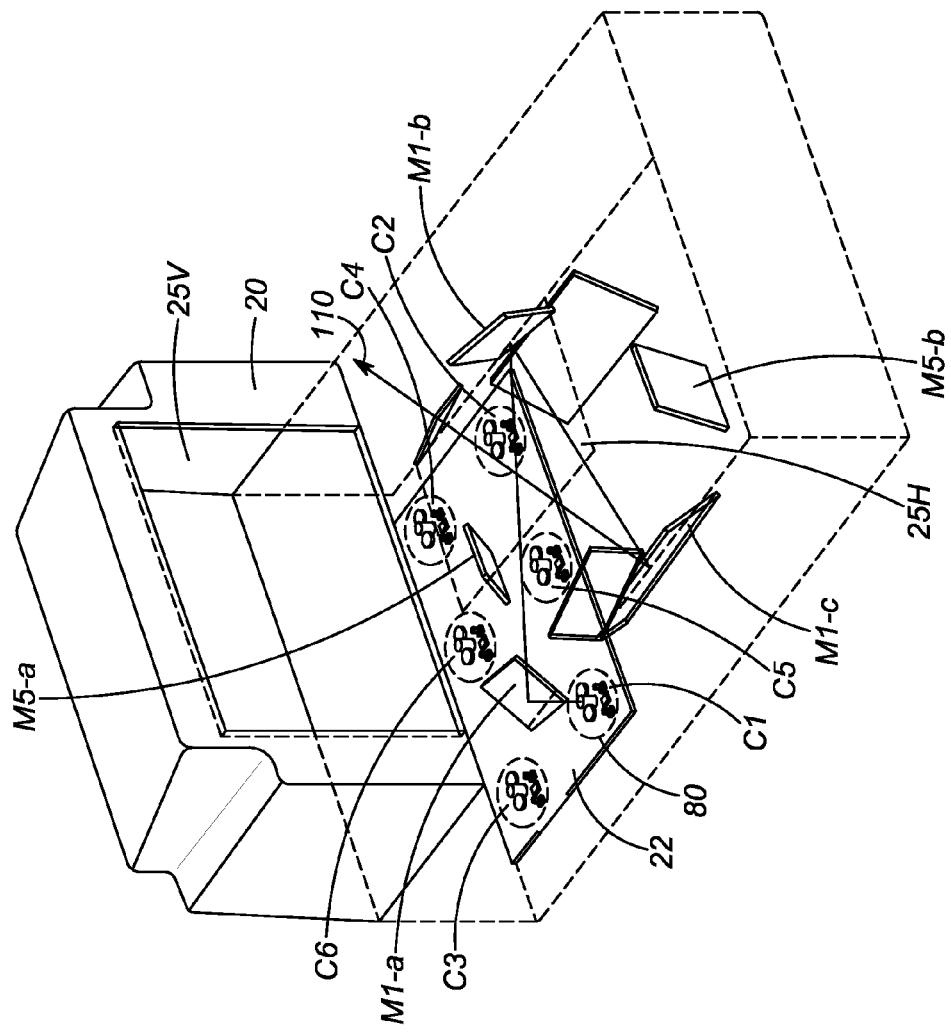
FIGS. 3A-3F are schematics of a bi-optical workstation that has six imaging sensors in accordance with some embodiments.

As shown in FIG. 3A, the imaging sensor C1 faces generally vertically upward toward an inclined folding mirror M1-a directly overhead at the left side of the horizontal window 25H. The folding mirror M1-a faces another inclined narrow folding mirror M1-b located at the right side of the horizontal window 25H. The folding mirror M1-b faces still another inclined wide folding mirror M1-c adjacent the mirror M1-a. The folding mirror M1-c faces out through the generally horizontal window 25H toward the right side of the workstation.

Figure 4A:
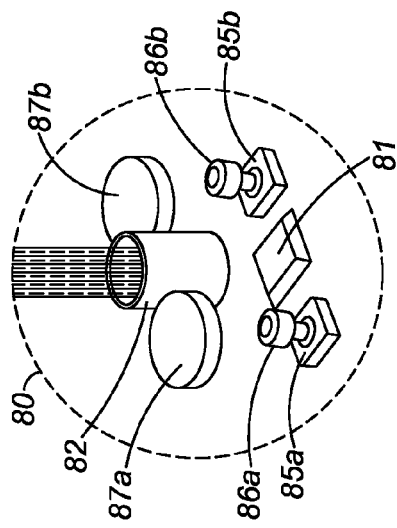
FIG. 4A shows the group of other optical components associated with the imaging sensor in FIG. 3A.

In FIG. 3A, it is shown that the imaging sensor C1 is also associated with a group of other optical components 80. FIG. 4A shows the group of other optical components 80 in details. In FIG. 4A, it is shown that the imaging sensor C1 includes a sensor array 81 and an imaging lens 82. It is also shown that two light emitting diodes 85a and 85b, spaced apart, are installed closely adjacent to the sensor array 81. When the light emitting diode 85a (or 85b) is energized, light emitted from the light emitting diode 85a (or 85b) passes through a light pipe 86a (or 86b) and a lens 87a (or 87b). As shown in FIG. 3A, light emitted from the light emitting diode 85a (or 85b), after bouncing off the folding mirrors M1-a, M1-b, and M1-c sequentially, exits the housing 20 as the first illumination pattern centered by the light ray 110.

In FIG. 3A, the folding mirrors M1-a, M1-b, and M1-c also constitute part of an optical system for defining a predetermined field of view for the imaging sensor C1. The predetermined field of view for the imaging sensor C1 generally is centered by the light ray 110. In addition, the predetermined field of view for the imaging sensor C1 is preferably within the first illumination pattern.

Figure 3B:
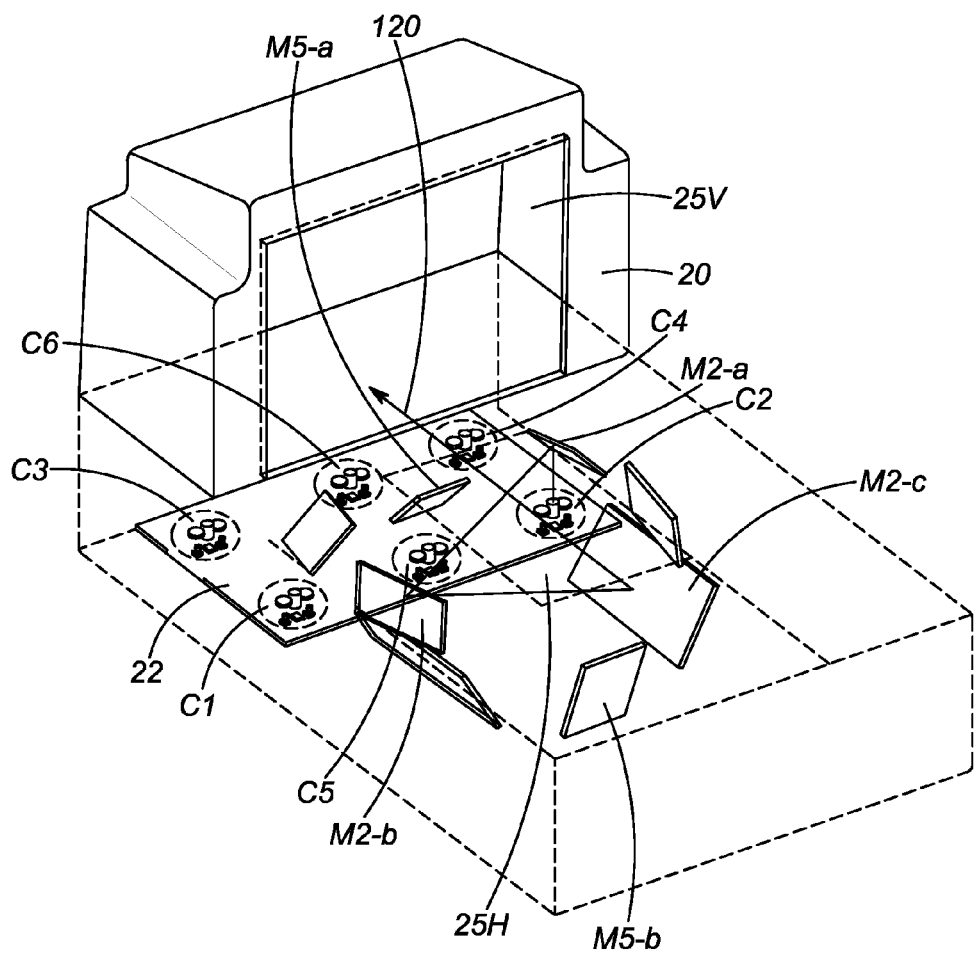

FIG. 3B depict the optical path for the imaging sensor C2. The imaging sensor C2 and its associated optics in FIG. 3B is mirror symmetrical to the imaging sensor C1 and its associated optics in FIG. 3A. As shown in FIG. 3B, the imaging sensor C2 faces generally vertically upward toward an inclined folding mirror M2-a directly overhead at the right side of the horizontal window 25H. The folding mirror M2-a faces another inclined narrow folding mirror M2-b located at the left side of the horizontal window 25H. The folding mirror M2-b faces still another inclined wide folding mirror M2-c adjacent the mirror M2-a. The folding mirror M2-c faces out through the generally horizontal window 25H toward the left side of the workstation.

In FIG. 3B, when a light emitting diode associated with imaging sensor C2 is energized, light emitted from such light emitting diode, after bouncing off the folding mirrors M2-a, M2-b, and M2-c sequentially, exits the housing 20 as the second illumination pattern centered by the light ray 120.

Figure 3C:
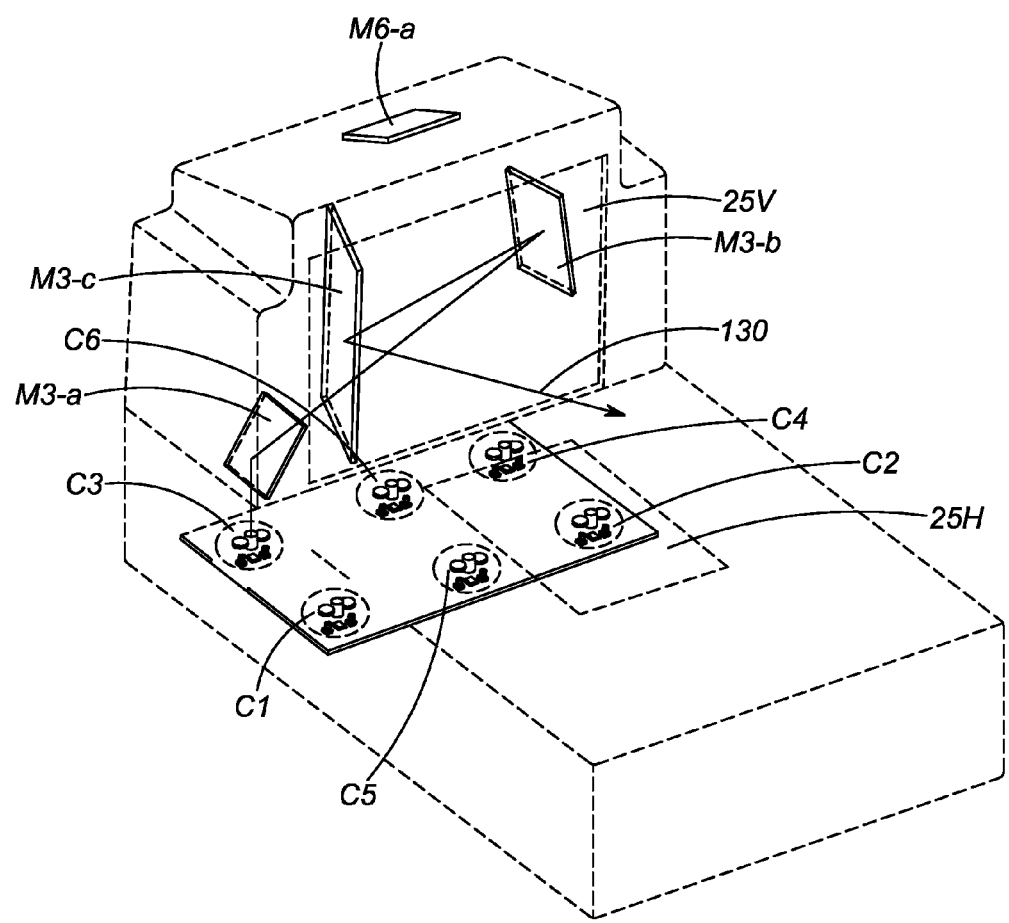

FIG. 3C depict the optical path for the imaging sensor C3. In FIG. 3C, the imaging sensor C3 faces generally vertically upward toward an inclined folding mirror M3-a directly overhead at the left side of the vertical window 25V. The folding mirror M3-a faces another inclined narrow folding mirror M3-b located at the right side of the vertical window 25V. The folding mirror M3-b faces still another inclined wide folding mirror M3-c adjacent the mirror M3-a. The folding mirror M3-c faces out through the generally vertical window 25V toward the right side of the workstation.

In FIG. 3C, when a light emitting diode associated with imaging sensor C3 is energized, light emitted from such light emitting diode, after bouncing off the folding mirrors M3-a, M3-b, and M3-c sequentially, exits the housing 20 as the third illumination pattern centered by the light ray 130.

Figure 3D:
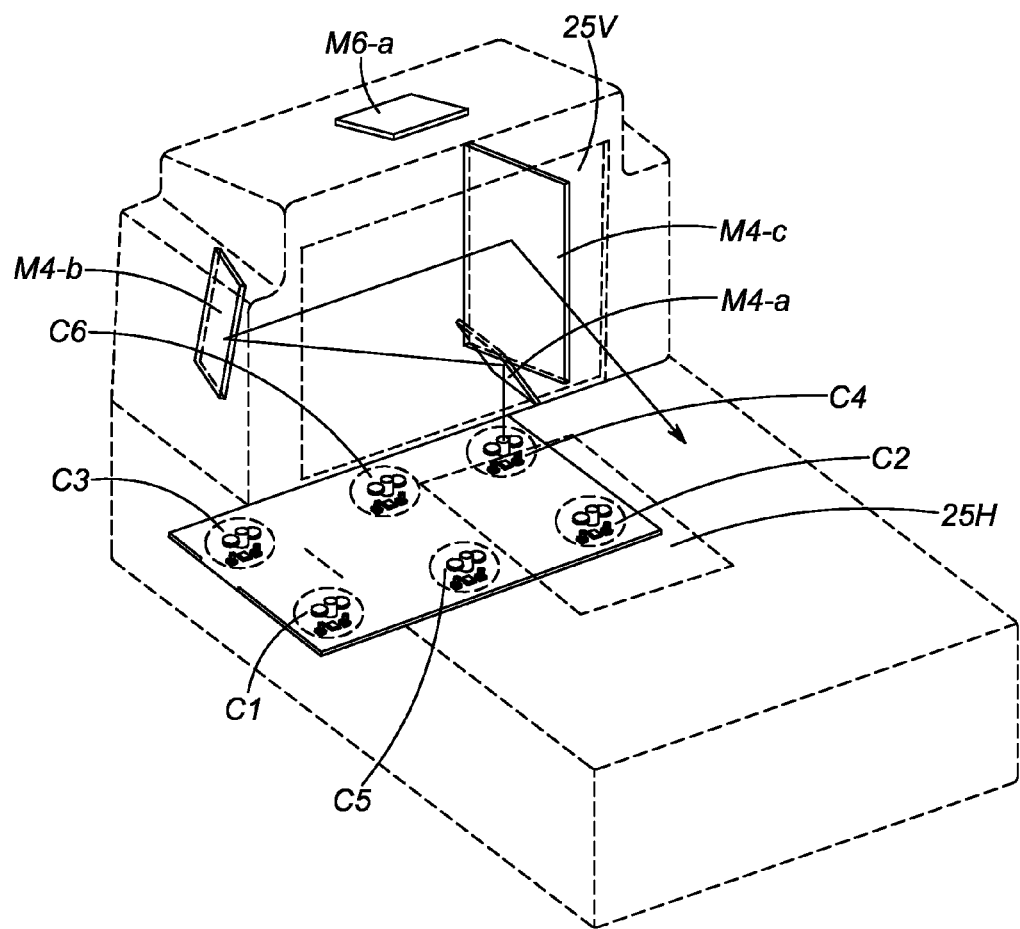

FIG. 3D depict the optical path for the imaging sensor C4. The imaging sensor C4 and its associated optics in FIG. 3D is mirror symmetrical to the imaging sensor C3 and its associated optics in FIG. 3C. In FIG. 3D, the imaging sensor C4 faces generally vertically upward toward an inclined folding mirror M4-a directly overhead at the right side of the vertical window 25V. The folding mirror M4-a faces another inclined narrow folding mirror M4-b located at the left side of the vertical window 25V. The folding mirror M4-b faces still another inclined wide folding mirror M4-c adjacent the mirror M4-a. The folding mirror M4-c faces out through the generally vertical window 25V toward the left side of the workstation.

In FIG. 3D, when a light emitting diode associated with imaging sensor C4 is energized, light emitted from such light emitting diode, after bouncing off the folding mirrors M4-a, M4-b, and M4-c sequentially, exits the housing 20 as the fourth illumination pattern centered by the light ray 140.

Figure 3E:
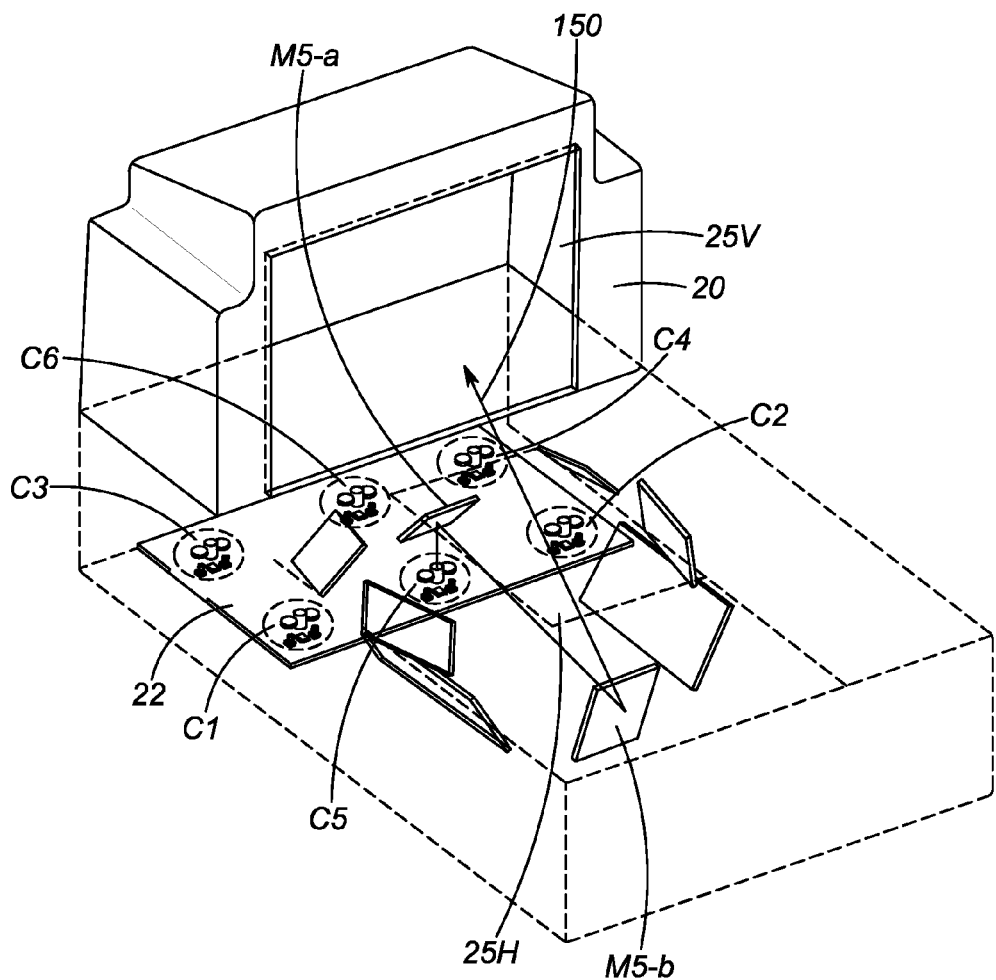

FIG. 3E depict the optical path for the imaging sensor C5. In FIG. 3E, the imaging sensor C5 and its associated optics are located generally near a center area between the imaging sensors C1 and C2. The imaging sensor C5 faces generally vertically upward toward an inclined folding mirror M5-a that is located directly overhead of the imaging sensor C5 and generally near a center area at one end of the window 25H. The folding mirror M5-a faces another inclined folding mirror M5-b located at the opposite end of the window 25H. The folding mirror M5-b faces out through the window 25H in an upward direction.

In FIG. 3E, when a light emitting diode associated with imaging sensor C5 is energized, light emitted from such light emitting diode, after bouncing off the folding mirrors M5-a and M5-b sequentially, exits the housing 20 as the fifth illumination pattern centered by the light ray 150.

Figure 3F:
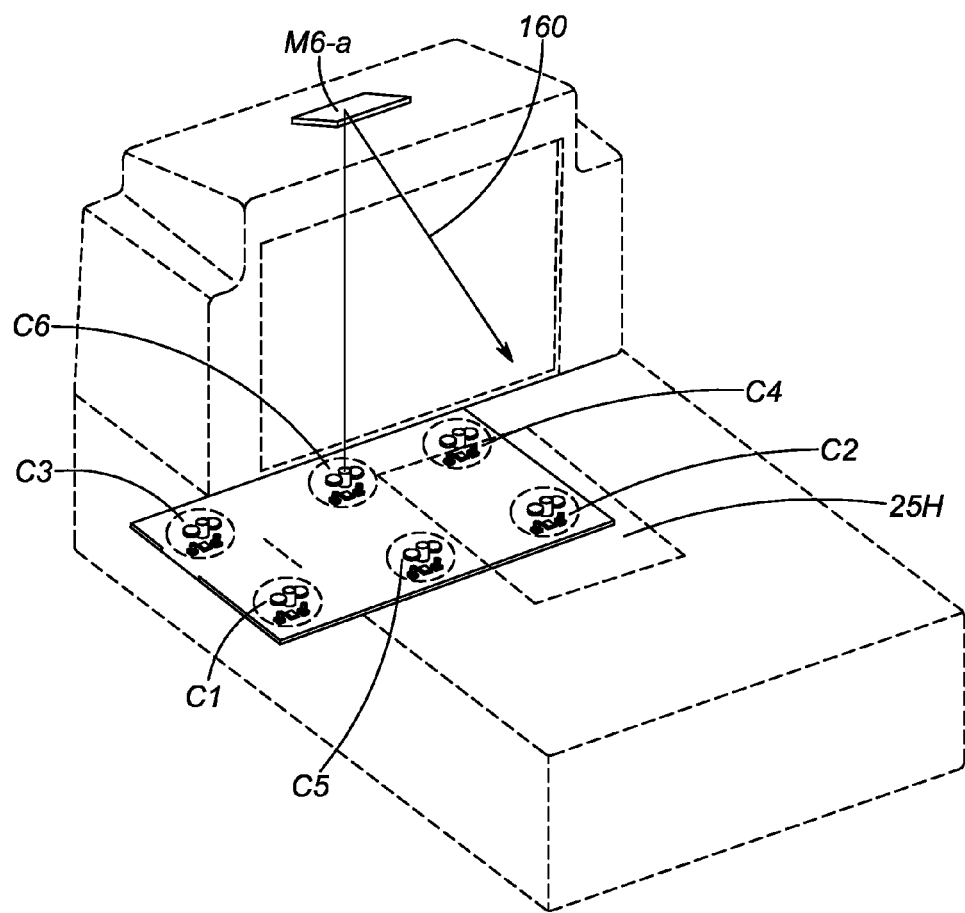

FIG. 3F depict the optical path for the imaging sensor C6. In FIG. 3F, the imaging sensor C6 and its associated optics are located generally near a center area between the imaging sensors C3 and C4. The imaging sensor C6 faces generally vertically upward toward an inclined folding mirror M6-a that is located directly overhead of the imaging sensor C6 and generally near a center area at an upper end of the window 25V. The folding mirror M6-a faces out through the window 25V in a downward direction toward the countertop of the workstation.

In FIG. 3F, when a light emitting diode associated with imaging sensor C5 is energized, light emitted from such light emitting diode, after bouncing off the folding mirror M6-a, exits the housing 20 as the six illumination pattern centered by the light ray 160.

Bioptics scanner uses a fixed, very short exposure time in order to be able to capture sharp images of bar codes moving with high speed. An illumination system of imaging bi-optic scanner has to be able to deliver enough light power and illuminate a large scanning volume of a scanner to allow capturing bright images when exposure time is very short. At the same time the light cannot be too high, so images of bar codes that are close to scanning windows would not be saturated. To satisfy these contradictory requirements, some of the current method of operating the scanner include alternating between two levels of illumination: (1) the low level allows capturing images that are not saturated when bar code is close, yet yields dark images when bar code is far, and (2) the high level allows capturing good images when bar code is far, yet produces saturated images when bar code is close. With the above described method, in some locations of the scanning volume, only half of all acquired image frames are useful, which significantly reduces the swipe speed. Therefore, it is desirable to provide an improved method for operating the illumination system in the scanner.

Figure 4B:
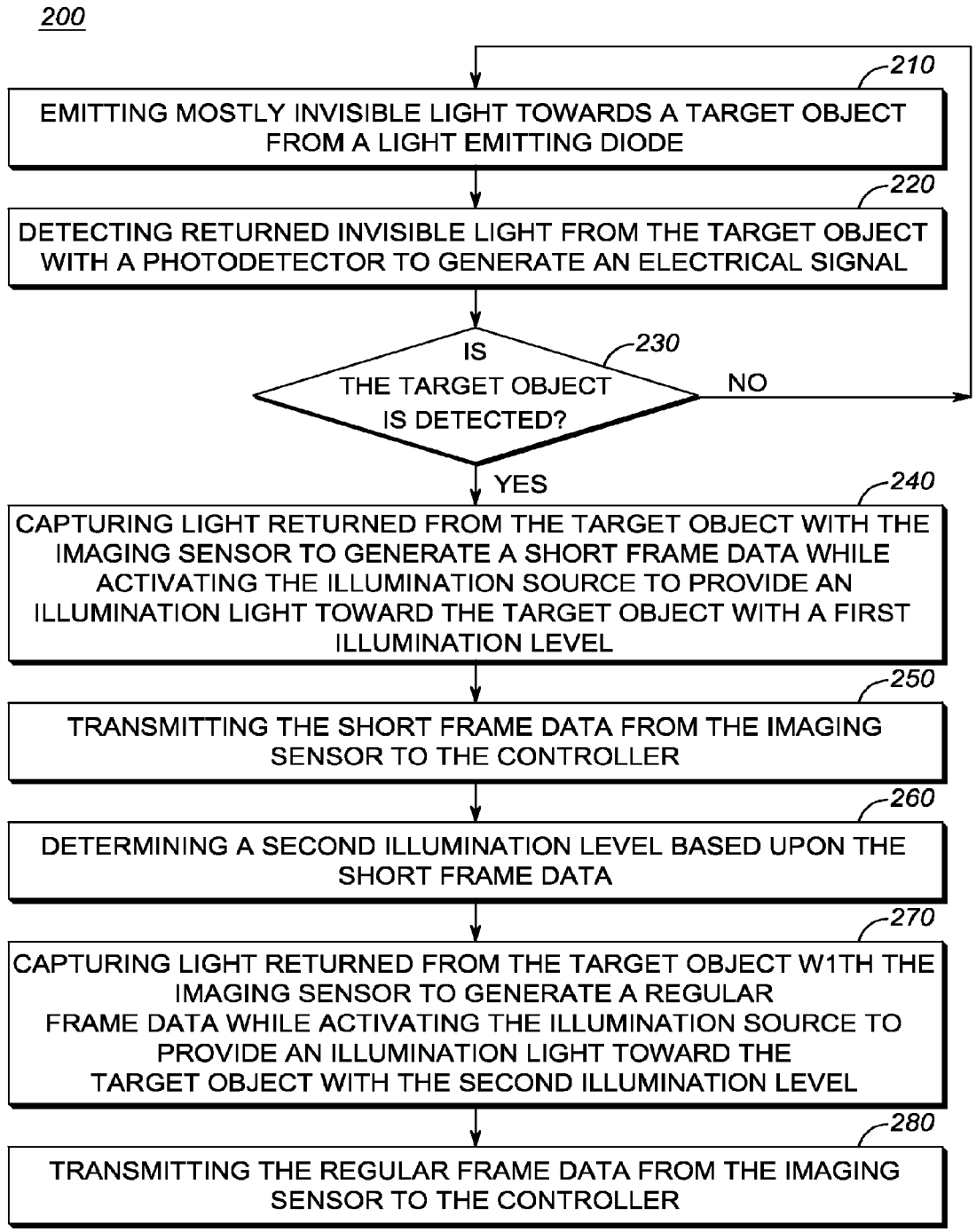
FIG. 4B is a flowchart of a method of operating an imaging scanner in accordance with some embodiments.

FIG. 4B is a flowchart of a method 200 for operating an imaging scanner in accordance with some embodiments. As shown in FIG. 4B, at block 210, block 220, and block 230, an object detector is used to detect whether the target object is presented to the imaging scanner. If the target object is detected, the imaging scanner will continue to capture the images of the target object. Specifically, at block 240, light returned from the target object is captured with the imaging sensor to generate a short frame data while the illumination source is activated to provide an illumination light toward the target object with a first illumination level; subsequently, at block 250, the short frame data is transmitted from the imaging sensor to the controller. Then, at block 260, a second illumination level is determined based upon the short frame data. Thereafter, at block 270 and block 280, light returned from the target object is captured with the imaging sensor to generate a regular frame data while the illumination source is activated to provide an illumination light toward the target object with the second illumination level, and the regular frame data is transmitted from the imaging sensor to the controller. The size of the regular frame data is at least 128 times larger than the size of the short frame data.

In one implementation, the short frame data includes a histogram of an image captured by the imaging sensor. In another implementation, the short frame data includes sub-sampling imaging data obtained from the image captured by the imaging sensor while the illumination light is set to the first illumination level. In some implementations, the size of the regular frame data can be at least 50 times larger than the size of the short frame data.

In some implementations, at block 260, the short frame data is processed to select the second illumination level from two predetermined illumination levels, and the second illumination level is selected to be lower than the first illumination level when the percentage of saturated pixels in the short frame data is larger than a predetermined threshold level. For example, the first illumination can be selected to be equal to the larger one of the two predetermined illumination levels. This allows for selecting the highest illumination level for capturing the regular frame data and avoiding image distortion due to image saturation. The criterion in this case is that the number of saturation pixels in a short frame and/or histogram is below the threshold. Otherwise a lower, of the two levels, is used for capturing the regular frame data.

In some implementations, at block 260, the short frame data is processed to select the second illumination level from two predetermined illumination levels, and the second illumination level is selected to be higher than the first illumination level unless the percentage of saturated pixels in an extrapolation of the short frame data is larger than a predetermined threshold level. For example, when the first illumination is selected to be equal to the smaller one of the two predetermined illumination levels, and then the digital/analog gain and image extrapolation can be used to select the second illumination level for capturing the regular frame data. Advantage is that perceived illumination and power consumption is only slightly affected. In some implementations, at block 260, the short frame data is acquired using the first illumination level that is lower of the two illumination levels. The second illumination level is selected to be higher than the two illumination levels when the percentage of saturated pixels in an extrapolation of the short frame data is smaller than a predetermined threshold. For example, when the first illumination is selected to be equal to the smaller one of the two predetermined illumination levels, and then the digital/analog gain and image extrapolation can be used to select the second illumination level for capturing the regular frame data. Advantage is that perceived illumination and power consumption is only slightly affected.

In still some implementations, at block 260, the sub-sampled image is analyzed to detect specific patterns in the sub-sampled image and exclude the image areas where the patterns accuse from histogram evaluation. For example a reflection from the long edge can be detected and the area of the image when this reflection occurs can be masked out from histogram calculations.

In still some implementations, at block 260, the short frame data is processed to select the second illumination level from N predetermined illumination levels. The integer N is less than four.

In some implementations, the methods 200 can include transmitting from the imaging sensor to the controller in sequence a first short frame data, a first regular frame data, a second short frame data, and a second regular frame data. The first short frame data can be used for determining the illumination level for capturing the first regular frame data, and the second short frame data can be used for determining the illumination level for capturing the second regular frame data. In still other implementations, the methods 200 can include transmitting from the imaging sensor to the controller in sequence a first short frame data, a first regular frame data, a second short frame data, a second regular frame data, a third short frame data, and a third regular frame data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of operating
emitting mostly invisible light towards a target object from a light emitting diode within a housing having a first window located in a generally horizontal plane and a second window located in a generally upright plane that intersects the generally horizontal plane;
detecting returned invisible light from the target object with a photodetector to generate an electrical signal;
activating an illumination source to provide an illumination light toward the target object after the electrical signal generated by the photodetector indicates that the returned invisible light from the target object is detected;
capturing light returned from the target object with a plurality of imaging sensors through the first window or through the second window, wherein each of the imaging sensors has an array of photosensitive elements;
transmitting from at least one of the imaging sensors to a controller a short frame data that is collected by the at least one of the imaging sensors when the illumination source is activated to provide the illumination light toward the target object with a first illumination level; and
transmitting subsequently from the at least one of the imaging sensors to the controller a regular frame data that is collected by the at least one of the imaging sensors when the illumination source is activated to provide the illumination light toward the target object with a second illumination level that is determined based upon the short frame data, the size of the regular frame data being at least 50 times larger than the size of the short frame data.

2. The method of claim 1, wherein the short frame data includes a histogram of an image captured by the at least one of the imaging sensors.

3. The method of claim 1, wherein the short frame data includes subsampling imaging data obtained from an image captured by the at least one of the imaging sensors.

4. The method of claim 1, wherein the size of the regular frame data is at least 128 times larger than the size of the short frame data.

5. The method of claim 1, further comprising:
processing the short frame data to select the second illumination level from two predetermined illumination levels.

6. The method of claim 5, wherein one of the two predetermined illumination levels is substantially equal to the first illumination level, and the second illumination level is selected to be lower than the first illumination level when the percentage of saturated pixels in the short frame data is larger than a predetermined threshold level.

7. The method of claim 5, wherein one of the two predetermined illumination levels is substantially equal to the first illumination level, and the second illumination level is selected to be higher than the first illumination level unless the percentage of saturated pixels in an extrapolation of the short frame data is larger than a predetermined threshold level.

8. The method of claim 1, further comprising:
processing the short frame data to select the second illumination level from two from N predetermined illumination levels, wherein integer N is less than four.

9. The method of claim 1, comprising:
transmitting from the at least one of the imaging sensors to the controller in sequence a first short frame data, a first regular frame data, a second short frame data, and a second regular frame data.

10. A workstation for imaging a target object, comprising:
a housing having a first window located in a generally horizontal plane and a second window located in a generally upright plane that intersects the generally horizontal plane;
an illumination source configured to be activated to provide an illumination light toward the target object;
a plurality of imaging sensors configured to capture light returned from the target object through the first window or through the second window, wherein each of the imaging sensors has an array of photosensitive elements;
a controller configured to receive data from at least one of the imaging sensors; and
wherein at least one of the imaging sensors is configured to transmit to the controller a short frame data and subsequently a regular frame data, the size of the regular frame data being at least 50 times larger than the size of the short frame data, wherein the short frame data is collected by the at least one of the imaging sensors when the illumination source is activated to provide the illumination light toward the target object with a first illumination level, and wherein the regular frame data is collected by the at least one of the imaging sensors when the illumination source is activated to provide the illumination light toward the target object with a second illumination level that is determined based upon the short frame data.

11. The workstation of claim 10, wherein the short frame data includes a histogram of an image captured by the at least one of the imaging sensors.

12. The workstation of claim 10, wherein the short frame data includes subsampling imaging data obtained from an image captured by the at least one of the imaging sensors.

13. The workstation of claim 10, wherein the second illumination level is selected based upon the short frame data from two predetermined illumination levels.

14. The workstation of claim 13, wherein the second illumination level is selected to be lower than the first illumination level when the percentage of saturated pixels in the short frame data is larger than a predetermined threshold level.

15. The workstation of claim 13, wherein the second illumination level is selected to be higher than the first illumination level unless the percentage of saturated pixels in an extrapolation of the short frame data is larger than a predetermined threshold level.

16. A workstation for imaging a target object, comprising:
a housing having a first window located in a generally horizontal plane and a second window located in a generally upright plane that intersects the generally horizontal plane;
a light emitting diode within the housing operative to emit mostly invisible light towards the target object;
a photodetector configured to detect returned invisible light from the target object to generate an electrical signal;
an illumination source configured to be activated to provide an illumination light toward the target object after the electrical signal generated by the photodetector indicates that the returned invisible light from the target object is detected;
a plurality of imaging sensors configured to capture light returned from the target object through the first window or through the second window, wherein each of the imaging sensors has an array of photosensitive elements;
a controller configured to receive data from at least one of the imaging sensors; and
wherein at least one of the imaging sensors is configured to transmit to the controller a short frame data and subsequently a regular frame data, the size of the regular frame data being at least 50 times larger than the size of the short frame data, wherein the short frame data is collected by the at least one of the imaging sensors when the illumination source is activated to provide the illumination light toward the target object with a first illumination level, and wherein the regular frame data is collected by the at least one of the imaging sensors when the illumination source is activated to provide the illumination light toward the target object with a second illumination level that is determined based upon the short frame data.

17. The workstation of claim 16, wherein the short frame data includes a histogram of an image captured by the at least one of the imaging sensors.

18. The workstation of claim 16, wherein the short frame data includes subsampling imaging data obtained from an image captured by the at least one of the imaging sensors.

19. The workstation of claim 16, wherein the second illumination level is selected based upon the short frame data from two predetermined illumination levels.

20. The workstation of claim 16, wherein the second illumination level is selected based upon the short frame data from N predetermined illumination levels, wherein integer N is less than four.

* * * * *